United States Patent [19]
Farouda

[11] Patent Number: 5,260,775
[45] Date of Patent: Nov. 9, 1993

[54] TIME DOMAIN TELEVISION NOISE REDUCTION SYSTEM

[76] Inventor: Yves C. Farouda, 26595 Anacapa Dr., Los Altos Hills, Calif. 94022

[21] Appl. No.: 683,807

[22] Filed: Apr. 11, 1991

Related U.S. Application Data

[63] Continuation-in-part of Ser. No. 580,785, Sep. 11, 1990, abandoned, which is a continuation-in-part of Ser. No. 503,313, Mar. 30, 1990, Pat. No. 5,025,312.

[51] Int. Cl.$^5$ .................. H04N 9/64; H04N 5/213
[52] U.S. Cl. .................................. 358/36; 358/31; 358/167
[58] Field of Search ............... 358/36, 37, 167, 31, 358/39, 40; 364/724.05, 724.01

[56] References Cited

U.S. PATENT DOCUMENTS

| | | | |
|---|---|---|---|
| 4,242,704 | 12/1980 | Ito et al. | 358/167 |
| 4,246,610 | 1/1981 | Takahashi | 358/167 |
| 4,262,304 | 4/1981 | Faroudja | 358/37 |
| 4,731,660 | 3/1988 | Faroudja et al. | 358/31 |
| 4,792,855 | 12/1988 | Yoshida | 358/167 |
| 4,825,289 | 4/1989 | Ohta | 358/167 |
| 4,827,342 | 5/1989 | Ohta | 358/167 |
| 4,833,537 | 5/1989 | Takeuchi et al. | 358/167 |
| 4,847,681 | 7/1989 | Faroudja et al. | 358/37 |
| 4,870,482 | 9/1989 | Yasuki et al. | 358/31 |
| 4,926,261 | 5/1990 | Matsumoto et al. | 258/167 |
| 5,016,111 | 5/1991 | Sakamoto et al. | 358/328 |
| 5,025,312 | 6/1991 | Faroudja | 358/36 |
| 5,063,438 | 11/1991 | Faroudja | 358/31 |
| 5,132,795 | 7/1992 | Campbell | 358/160 |
| 5,136,385 | 8/1992 | Campbell | 358/160 |
| 5,161,018 | 11/1992 | Matsunaga | 358/167 |

FOREIGN PATENT DOCUMENTS

| | | |
|---|---|---|
| 0169035 | 1/1986 | European Pat. Off. . |
| 0218241 | 4/1987 | European Pat. Off. . |
| 1140887 | 5/1991 | Japan . |

Primary Examiner—James J. Groody
Assistant Examiner—Safet Metjahic
Attorney, Agent, or Firm—Thomas A. Gallagher

[57] ABSTRACT

A noise reduction method for a baseband television picture signal, such as luminance or chrominance, received via a noise-introducing path comprises the steps of:

averaging the picture signal over a predetermined time interval related to frame rate of the picture signal, such as over a number of successive frames, to produce an averaged function of the picture signal wherein recurrent stationary picture elements the picture signal are cancelled, and wherein aperiodic events in the picture signal, including noise, are put out as an average, passing the average through an amplitude function generator for putting out a non-linear function of the average, the non-linear function favoring low amplitude levels and disfavoring high amplitude levels in the picture signal, thereby to provide a noise reduction cancellation signal, and combining the noise reduction cancellation signal with the picture signal, thereby to reduce the noise therein.

Apparatus for implementing the method, including time domaim comb filter apparatus for separating luminance and chrominance, is also described.

29 Claims, 8 Drawing Sheets

TIME DOMAIN TELEVISION NOISE REDUCTION SYSTEM

REFERENCE TO RELATED APPLICATIONS

The present application is a continuation-in-part of U.S. patent application Ser. No. 07/580,785 filed on Sep. 11, 1990, now abandoned, which is a continuation-in-part of U.S. patent application Ser. No. 07/503,313 filed on Mar. 30, 1990, now U.S. Pat. No. 5,025,312.

FIELD OF THE INVENTION

The present invention relates to signal processing methods and apparatus for use within television video and display apparatus. More particularly, the present invention relates to improved and simplified time domain color television noise reduction methods for use within television receivers and displays.

BACKGROUND OF THE INVENTION

The present inventor's prior U.S. patent application, Ser. No. 07/503,313 filed on Mar. 30, 1990, and entitled "Motion-Adaptive Video Noise Reduction System Using Recirculation and Coring" represented a considerable and successful effort to realize a very efficient luminance/chrominance noise reducer employing frame rate recirculation and resultant noise reduction. While the unit described in the referenced patent application works particularly well as a stand-alone unit, presently the costs of the digital components necessary to implement the principles described therein are sufficiently high as to make it impractical to include those concepts and embodiments within a digital television set intended for the mass consumer marketplace.

With the advent of application-specific digital large scale integrated circuits, it is practical to realize and achieve a truly digital television set at a sufficiently low price as to enable the set to be marketed to consumers for home use. In such a set, while the input signal is analog NTSC for example, the output is line doubled red, green and blue display driving signals (as well as the necessary synchronization and driving signals for the display).

Temporal domain comb filter separators are known for separating chrominance and luminance components of a quadrature modulated subcarrier color television signal. Such comb filter structures typically employ a single frame delay, or more preferably employ two single frame delays connected in tandem. Fractional gain amplifiers and a summing junction enable the function $-\frac{1}{4}V1 + \frac{1}{2}V2 - \frac{1}{4}V3$ to be combined so as to separate chrominance from a baseband signal on a frame by frame basis. The advantage of a temporal domain (frame delay based) comb filter separator over a spatial domain (line delay based) is that resolution along diagonal dimensions, particularly edges along ±45 degrees, is not degraded for stationary picture images. The disadvantage of a temporal domain comb filter separator is that it ceases to function effectively during conditions of motion in the picture. Adaptivity techniques, such as motion adaptivity, and/or bidimensional comb filtering techniques, may be employed to ameliorate somewhat the disadvantage of the breakdown of temporal domain comb filter separation in the presence of motion in the picture. The present applicant's published European Patent Application, No. 0 218 241 published on Apr. 15, 1987, illustrates salient aspects of a bidimensional comb filter decoder, particularly in conjunction with FIG. 5 thereof.

While the cost of digital memory integrated circuits is constantly being reduced, and digital video frame stores are readily implemented, even within consumer television set comb filter decoders, the subjective improvement along diagonal transitions in the color picture remains offset by the still not insubstantial costs of such memory circuits. Thus, one hitherto unsolved need has remained for providing additional functionality to the frame delays included within temporal domain comb filter separators at the receiver.

While it is conceivable that the noise reduction embodiments given in the referenced parent application can be modified to make use of the frame delays included within the temporal domain comb filter separator, the modification would necessarily be cumbersome and difficult to realize in practice.

SUMMARY OF THE INVENTION

A general object of the present invention is to provide a baseband signal noise reducer for a television decoder/display which employs temporal domain signal processing elements and techniques in a manner which overcomes limitations and drawbacks of the prior art.

Another more specific object of the present invention is to provide a noise reduction method which operates upon baseband chrominance and luminance which have been separated from a color composite signal within decoder circuitry of a color television receiver.

Yet another specific object of the present invention is to provide a noise reduction capability by adding a few circuit elements and connections to temporal domain comb filter chroma-luminance decoder circuitry within a color television receiver, thereby to expand the functionality and utility of frame delay elements to a noise reduction function as well as to a chroma-luminance separation function.

A still further specific object of the present invention is to provide a luminance and chrominance noise reduction system which adaptively adjusts to incoming noise level at a color television receiver.

One more specific object of the present invention is to provide a noise reduction method which is adaptively attenuated in the presence of low amplitude level motion activity within the television picture signal.

Yet another specific object of the present invention is to provide a noise reduction system which is particularly well suited for inclusion within a color television digital receiver.

Yet one more specific object of the present invention is to provide a noise reduction method for a color television set which achieves an effective 4.2 dB signal-to-noise improvement based on temporal domain signal processing without introduction of significantly perceptible motion blurring artifacts and which may be realized with very little additional cost beyond that incurred to implement a two-frame-delay-based temporal comb filter chroma-luminance separator within the color television set.

A still further object of the present invention is to realize noise reduction in luminance by averaging the luminance low frequencies over several frames such that only aperiodic noise is spread out in the time domain as opposed to periodically recurrent picture images.

A noise reduction method for a television picture signal received via a noise-introducing path comprises the steps of:

averaging the picture signal over a predetermined time domain related to frame rate of the picture signal, such as a predetermined number of frames, in order to produce an averaged function of the incoming television picture signal wherein recurrent stationary picture elements of the picture signal are cancelled, and wherein aperiodic events in the picture signal, including noise, are put out as the average, passing the average through an amplitude function generator for putting out a non-linear amplitude transfer function of the average, the non-linear amplitude function favoring low amplitude levels and disfavoring high amplitude levels in the picture signal, thereby to provide a noise reduction cancellation signal, and combining the noise reduction cancellation signal with the picture signal, thereby to reduce the noise therein.

In one aspect of the present invention, the picture signal is baseband luminance, or baseband chrominance.

In another aspect of the present invention, the non-linear amplitude transfer function is approximately linear from zero to a first predetermined amplitude value, such as 10-20 IRE Units, and returns approximately linearly from the first predetermined amplitude value to approach zero at a second predetermined amplitude value such as approximately 35-55 IRE Units.

In a further aspect of the present invention, the averaging step produces the average as:

$$-\tfrac{1}{4}V1 + \tfrac{1}{2}V2 - \tfrac{1}{4}V3$$

where the time delay interval between V1 and V2 is one frame period, and the time interval between V1 and V3 is two frame intervals.

In one more aspect of the present invention, the method thereof includes the further steps of detecting noise level in the picture signal, and controlling the transfer characteristic of the amplitude transfer function of the amplitude function generator in direct relation to detected noise level.

In still one more aspect of the present invention, the method thereof includes the further steps of detecting motion in the picture signal, developing a motion control related to duration and magnitude of detected motion, and controlling the output of the function generator in function of the motion control. In this aspect, the step of controlling the output of the function generator means is preferably carried out by passing an output therefrom through a proportional switch controlled by the motion control.

In yet another aspect of the present invention, the method is simultaneously carried out for luminance and chrominance as based upon a single motion control signal preferably derived from the greater one of detected chroma motion and detected luminance motion.

Apparatus implementing aspects of the invention includes a luminance component noise reducer for a quadrature modulated subcarrier color television signal including a separated luminance component and a separated chrominance component. The signal is received via a noise-introducing path. The noise reducer includes a luminance component input, a noise-reduced luminance output, and a frame delay circuit connected to the input An averaging circuit is connected to the input and to the frame delay circuit for generating an average of luminance in which recurrent picture elements are cancelled and non-recurrent picture elements are put out as the average. An amplitude function generator is connected to receive and put out a non-linear function of the average in accordance with a predetermined transfer characteristic, such that the non-linear function favors low amplitude levels and disfavors high amplitude levels in the average, thereby to provide a noise reduction cancellation signal. Finally, a combining circuit is connected to the frame delay circuit and to the amplitude function generator so as to combine a said luminance component obtained from the frame delay circuit with the noise reduction cancellation signal, such that the noise in the said luminance component is thereby reduced.

In one further aspect of the present invention, a signal processor is provided for, and most preferably within, a quadrature modulated subcarrier composite television signal receiver wherein the composite signal includes a luminance component and a chrominance component. The signal processor comprises a time domain comb filter separator and a luminance component noise reducer. The comb filter separator includes a V1 signal input for receiving the undelayed composite signal, a first frame delay connected to the V1 signal input and having a one-frame-delayed V2 output, a second frame delay connected to the V2 output and having a two-frame-delayed V3 output, a first amplifier connected to the V1 signal input for providing an output in the form of $-\tfrac{1}{4}V1$, a second amplifier connected to the V2 output for providing an output in the form of $+\tfrac{1}{2}V2$, a third amplifier connected to the V3 output for providing an output in the form of $-\tfrac{1}{4}V3$, and a combiner connected for combining the $-\tfrac{1}{4}V1 + \tfrac{1}{2}V2$ and $-\tfrac{1}{4}V3$ outputs to provide a full bandwidth combed chrominance component output. (A chroma band pass filter may be provided at the output of the combiner).

The luminance component noise reducer of the signal processor includes an amplitude function generator connected to receive and process the combed chrominance component output in accordance with a non-linear function such that the non-linear function favors low amplitude levels and disfavors high amplitude levels in the combed chrominance component output, thereby to provide a noise reduction cancellation signal, a first subtractor for subtracting the noise reduction cancellation signal from the combed chrominance component to provide a chroma/noise cancellation signal; and, the signal processor includes a second subtractor for subtracting the chroma/noise cancellation signal from the V2 output, thereby to provide a combed luminance component in which noise has been reduced.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

In order to realize an effective luminance noise reduction system for use within a television set, for example, one must first determine what is the difference between luminance noise and the luminance signal or component. The inventor has observed that luminance noise is small in amplitude; and, luminance noise motion from frame to frame tends to be random, moving in both directions.

On the other hand, there is a frame-to-frame repeatability of motion of a picture object. Motion which has a random quality is very rarely encountered in picture images based in reality (as opposed to artificially generated cartoon images, video graphics, and the like, for example). Since random picture content motion is so rarely encountered, the viewer will not be annoyed by a certain degree of picture quality loss incident to such rare occurrences. For example, it is rare to encounter a flash of light which is of small amplitude and which moves in both directions on a frame by frame basis, if the light flash is not noise.

In the case of transitions or edges in motion, if one were to average the low frequencies as by $Y = -\frac{1}{4}V1 + \frac{1}{2}V2 - \frac{1}{4}V3$, the result would be a picture object which is preceded and followed by an image of itself, as when it is moving from left to right. This multiple-image result would not be aesthetically acceptable, even though it would have the desired result of reducing by 4.2 dB aperiodic noise in the picture.

Since noise is typically a low amplitude level phenomena and is significantly below the level of major object edges within the video picture, it is practical to control the amount of noise reduction as a function of the amplitude of the incoming picture signal, e.g. see FIGS. 2A and 2B discussed hereinafter. The noise will statistically lie within the area blocked by dashed lines in FIG. 2A, i.e. from zero to about 10 IRE units in amplitude. It is these low level noise artifacts which are most suited to reduction by averaging over several frames. By the time that a transition level reaches about 40 IRE units, there should be no averaging thereof by the noise reduction system, so that major edges, whether stationary or in motion within the picture, do not result in ghosts or multiple images when they are in motion in the picture image being displayed.

Figure 1:
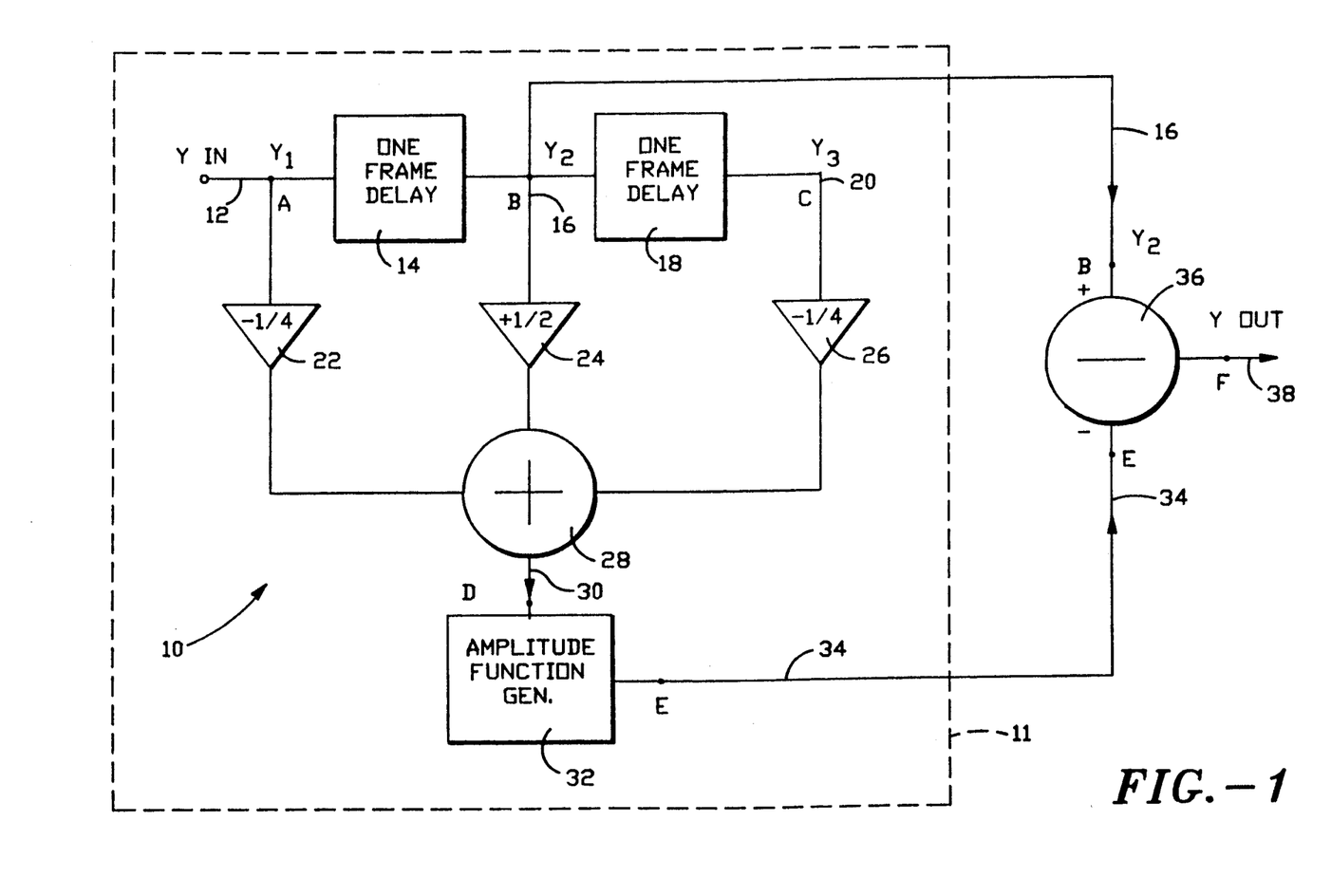
FIG. 1 is a block diagram of a luminance component/chrominance component noise reduction circuit employing two frame delays in accordance with the principles of the present invention.

Turning now to FIG. 1, a temporal domain noise reduction system 10 incorporating the principles of the present invention is depicted. Therein, a luminance input 12 receives e.g., a separated luminance component Y1. This component Y1 at the input 12 passes through a one frame delay circuit 14 to reach a node 16 which represents a Y2 one-frame-delayed luminance component. The component Y2 then passes through a second one frame delay circuit 18 to reach a node 20 representing a two-frame-delayed luminance component Y3.

The Y1 luminance component at the input 12 passes through a minus quarter-amplitude gain amplifier 22; the Y2 luminance component at the node 16 passes through a plus half-amplitude amplifier 24; and, the Y3 luminance component passes through a minus quarter-amplitude amplifier 26. The outputs from the amplifiers 22, 24 and 26 are combined in a combiner circuit 28 which puts out the function $-\frac{1}{4}V1 + \frac{1}{2}V2 - \frac{1}{4}V3$ at a node 30.

Figure 2A:
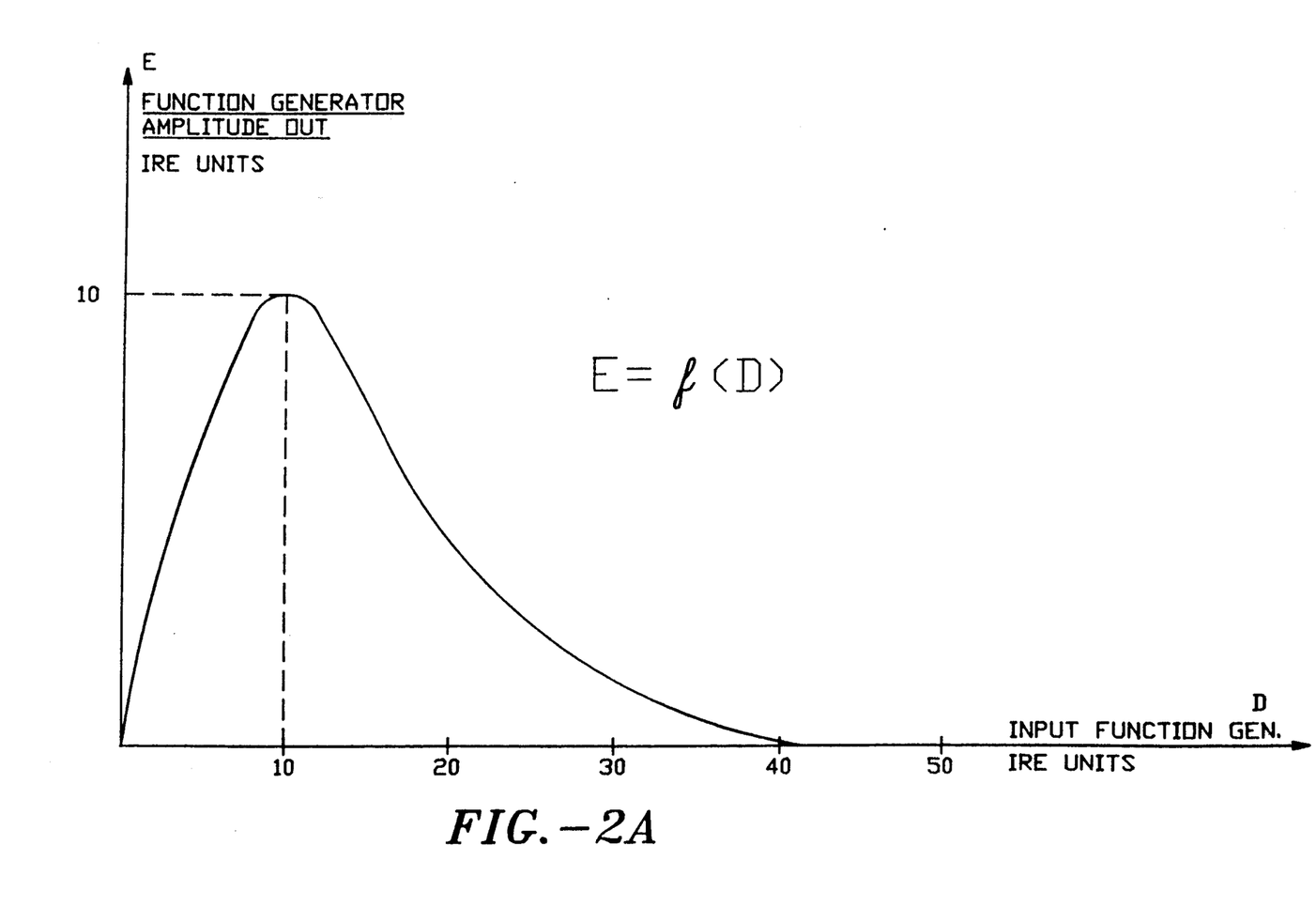
FIG. 2A is a graph of an amplitude function implemented within an amplitude function generator element the FIG. 1 system.
Figure 2B:
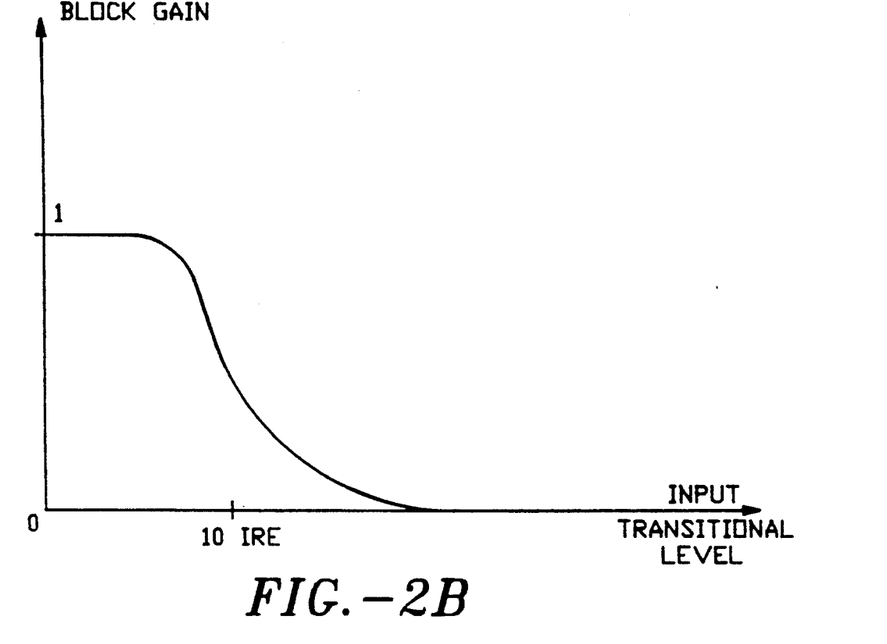
FIG. 2B is a graph of block gain resulting in the amplitude function depicted in FIG. 2A.

The node 30 leads directly to an amplitude function generator 32 which implements a transfer function, e.g. as graphed in FIGS. 2A and 2B, such that the output amplitude of the generator 32 on a line 34 is approximately linear with the input amplitude for very low amplitude levels, such as from zero to 10 IRE units. This initial, approximately linear portion of the transfer function curve graphed in FIG. 2 is within a dashed-line box denoting that it is in this region that noise and small amplitude moving object signals are to be found.

After about 10 IRE units of incoming signal level, the output amplitude function quickly flattens and then reverses and rapidly approaches zero as the incoming level reaches e.g. about 40 IRE units. Thus, for transition edges which are at or above 40 IRE units relative to background, the output of the function generator 32 will be zero.

The output from the amplitude function generator on the line 34 is thus an average of low level uncorrelated picture information on a frame by frame basis (i.e. noise or motion). This average is then subtracted from the Y2 luminance signal in a subtractor circuit 36. While the output shown in FIG. 1 is denoted "luminance", it could as easily be chrominance providing that chrominance is the signal present at the input 12.

The noise reduction achieved by the system 10 is equal to:

$$\sqrt{[(-\tfrac{1}{4}V1)^2 + (\tfrac{1}{2}V2)^2 + (-\tfrac{1}{4}V3)^2]}.$$

This square root equals a signal to noise improvement of +4.2 dB.

Figure 1A:
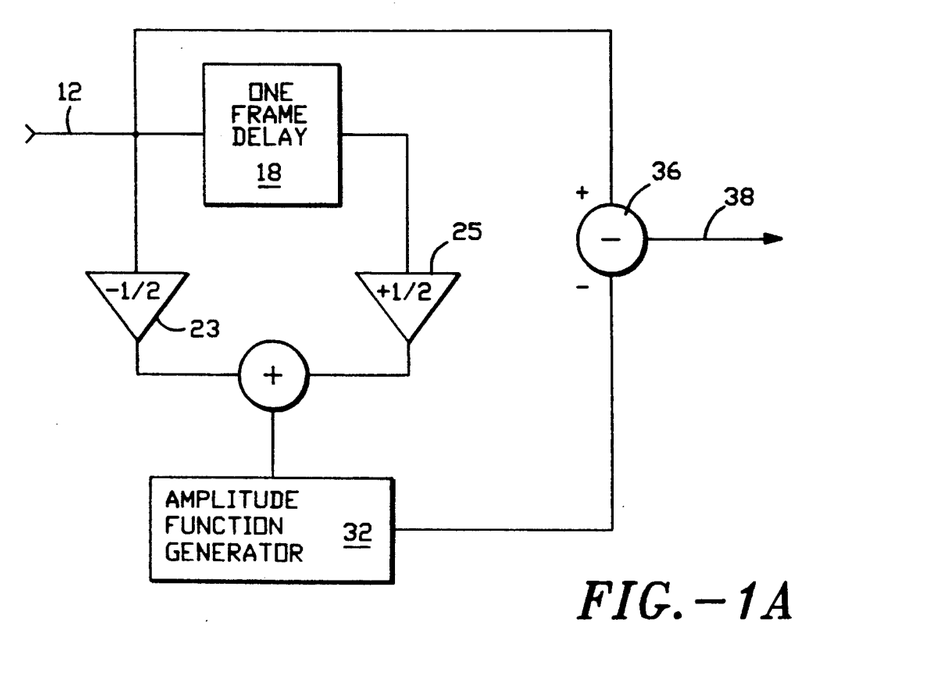
FIG. 1A is a block diagram of a single frame noise reduction system also incorporating the principles of the present invention.

FIG. 1A depicts a somewhat less effective circuit 10' employing but one frame delay 18. Amplifier 23 has a gain factor of $-\frac{1}{2}$ while amplifier 15 has a gain factor of a summing circuit 27 and then passed through the amplitude function generator 32 to yield an E' signal. The E' signal is subtracted from the B' signal (which is the same signal as the input 12' in the combining circuit 36, and an output 38 provides a noise reduced luminance or chrominance component.

Figure 3A:
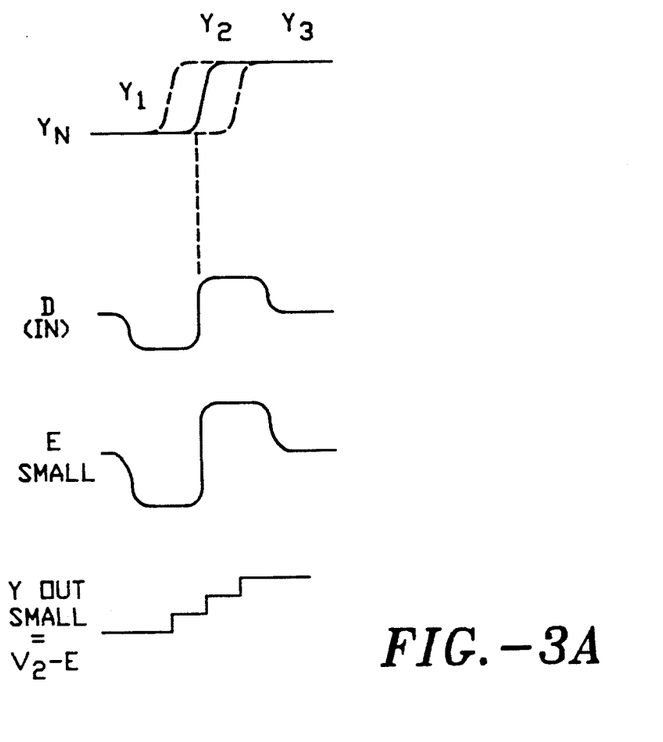
FIG. 3A is a series of graphs of a small amplitude edge transition signal of a moving object taken at variously labelled locations within the FIG. 1 system.
Figure 3B:
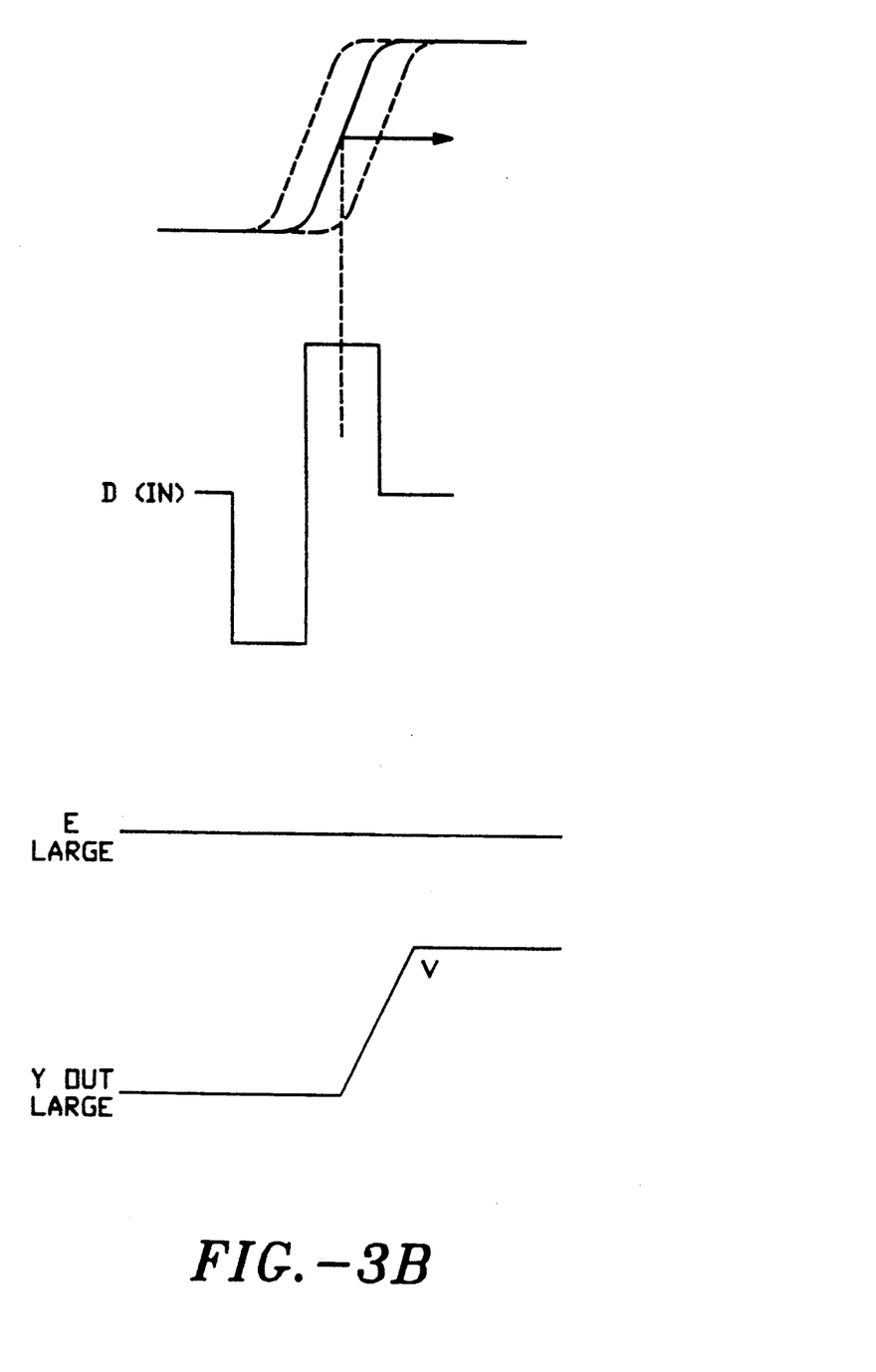
FIG. 3B is a series of graphs of a large amplitude edge transition signal taken at the same locations as in the FIG. 3A graphs.

FIGS. 3A and 3B illustrate the operation of the FIG. 1 system upon moving objects. FIG. 3A graphs a small transition edge having approximately a 7 IRE unit level and being in motion such that the transition is spatially displaced at Y1, Y2 and Y3. The average value put out from the summing junction 28 (graph D) approximates a square wave. This square wave (graph D of FIG. 3A) is then subtracted from a Y2 component from the node 16 (after being properly delay matched to account for processing delays in the amplifiers 22, 24 and 26, summing junction 28 and amplitude function generator 32). The resultant difference value, Y out at the node 38, represents a blurring over the three frames of the transition edge. Since the eye is not particularly responsive to the sharpness of small objects in motion in the picture signal, the blurring goes virtually unnoticed, although the coherence of the image as an object in motion will be perceived by the viewer.

For large edges in motion, such as those having about 40 IRE unit contrast with the background, or more, (as graphed in FIG. 3B), the amplitude function generator 32 will not put out any function to the subtractor 36, and there will be no reduction in amplitude (sharpness loss) or averaging applied to the large motion transition.

Figure 4:
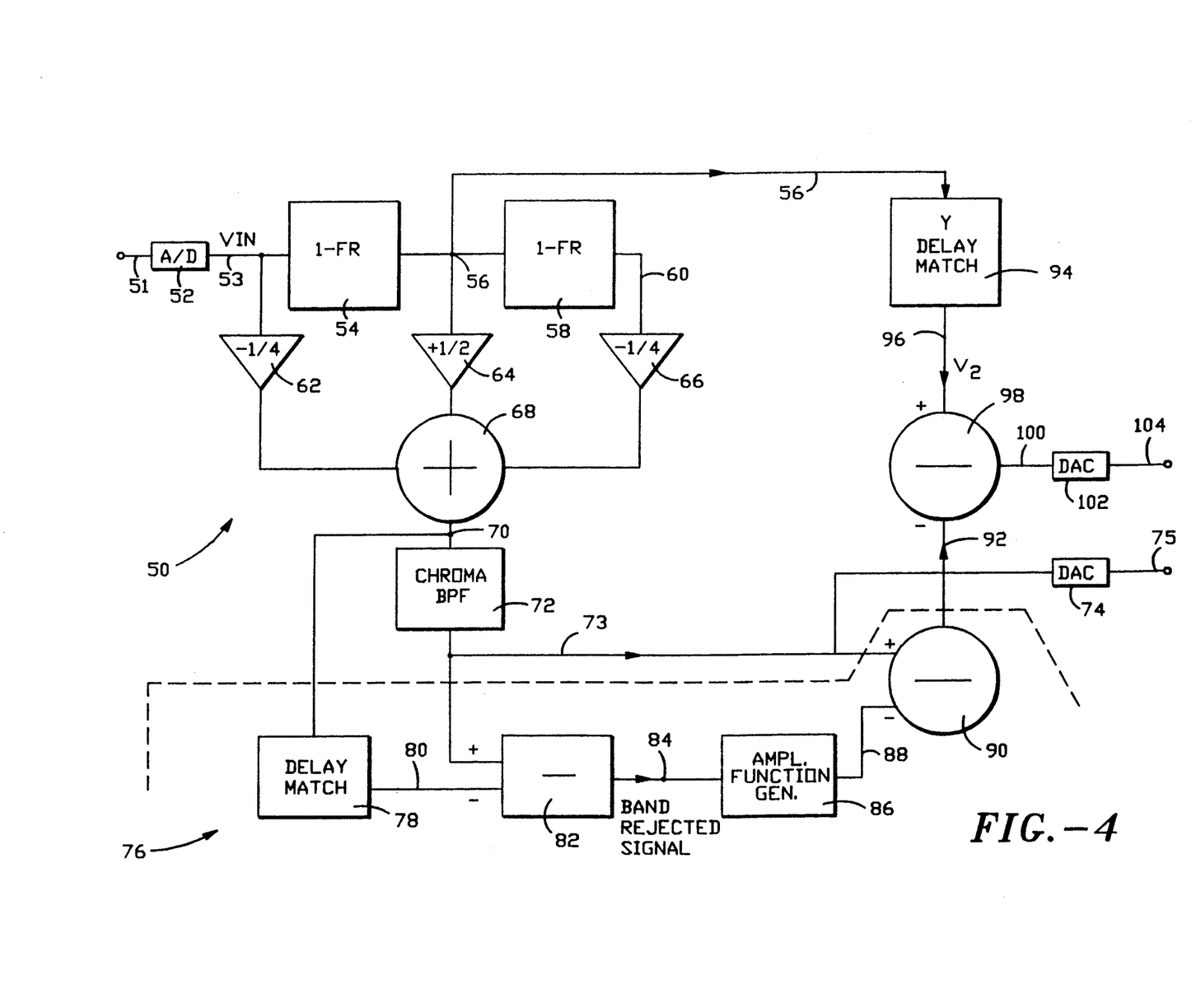
FIG. 4 is a block diagram of a temporal domain comb filter chroma-luminance separator to which a noise reduction function has been added by inclusion of a few additional structural elements, the comb filter circuit being above the dashed line, and the noise reduction components added being shown below the dashed line in FIG. 4.

Turning now to FIG. 4, a temporal domain luminance-chrominance comb filter separator 50 effectively separates luminance and chrominance components from a composite video input. In the structure 50, the sharpness of diagonal transitions is preserved for stationary objects within the picture image, and so there are significant advantages achieved by the separator structure 50 separate and apart from any noise reduction function. Structural elements comprising a noise reducer 76 are added to the comb filter separator structure 50, as shown in FIG. 4, thereby to achieve not only effective temporal domain comb filter separation of luminance and chrominance components, but also significant noise reduction of the luminance component.

The separator 50 includes an analog input 51 for receiving a quadrature modulated subcarrier color television signal, such as in the NTSC color format. An analog to digital converter 52 quantizes the incoming signal at a suitable sampling rate, typically four times the subcarrier frequency. A digitized input 53 leads through a digital frame delay 54 to a one-frame-delayed node 56. The one-frame-delayed node 56 leads through a second digital frame delay structure 58 to a two-frame-delayed node 60. The digital frame delays 54 and 58 may be implemented with digital memory devices; however, since single bit errors are not critical to picture quality in video applications, the specifications for the memory devices may be somewhat more relaxed than those applicable to computer grade memory devices.

Amplifier functions 62, 64 and 66 effectively reduce the magnitudes of the incoming digital video component entering them, by three quarters in the case of functions 62 and 66 and by one half in the case of the function 64. Functions 62 and 66 also invert the signs of the incoming components. While analog amplifier symbols are used in FIG. 4, the "amplification" and "sign-inversion" functions are carried out digitally in a known fashion. A summing node 68 combines the outputs from the amplification functions 62, 64 and 66 to provide an output function on a line 70 in which frame-to-frame-coherent luminance components are cancelled, and which effectively passes chrominance components, luminance components spectrally overlapping into the chrominance energy bands, and noise.

The line 70 leads to a band pass filter 72 which has a passband centered at the chrominance subcarrier frequency, and $-6$ db rolloffs at about plus and minus one megahertz relative to the color subcarrier frequency e.g. about 2.5 MHz and 4.5 MHz in the NTSC format with a color subcarrier at 3.579545 MHz). An output line 73 carries temporal-domain-combed chrominance to a digital to analog converter function 74 which provides analog combed chrominance at an output 75. At this point, combed luminance may be obtained by subtracting combed chrominance from delay matched composite video.

With a few additional functional elements, largely realized in software/firmware, a luminance noise reduction function 76 is added to the comb filter separation function 50. The line 70 also leads through a delay matching circuit 78 for matching processing delays associated with the band pass filter function 72. A delay matched output line 80 leads to a subtrahend input of a difference function 82, while the line 73 leads to a minuend input of the function 82. The resulting difference on an output line 84 comprises the difference between the full spectrum digital video signal at the output of the combining circuit 68 and the band passed chrominance components: i.e., low frequency luminance and noise components. These components are then passed through an amplitude function generator 86 having the same operational characteristics (FIG. 2) as the amplitude function generator 32 described in conjunction with the FIG. system 10 previously described.

The output from the function generator 86 on a line 88 is then differenced from the combed chrominance on the line 73 at a difference function 90, to yield a resultant on a line 92. One-frame-delayed composite video on the line 56 is delay matched in a delay matching function 94 having a time delay to match the delay of the chroma band pass filter function. Delay matched composite video is put out on a line 96. The resultant on the line 92 is subtracted from the delay-matched composite video on the line 96 in a difference circuit 98. The resultant output on a line 100 is comb filter separated luminance in which noise has been reduced in accordance with the principles of the present invention. This comb filter separated, noise reduced luminance may then be converted to analog by a digital to analog conversion function 102 and is available as an analog signal on a line 104.

Figure 5:
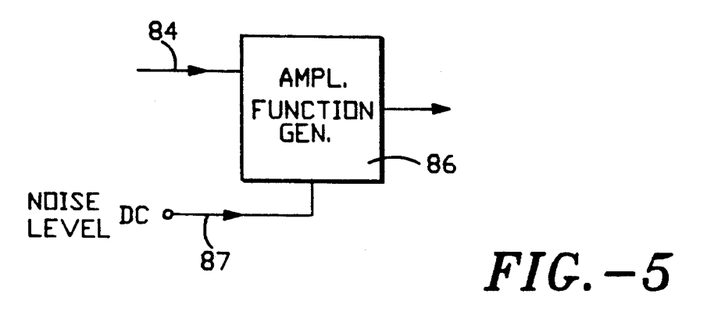
FIG. 5 illustrates a modification of the FIG. 1 amplitude function generator element by which it is controlled by a noise amplitude control value.
Figure 6:
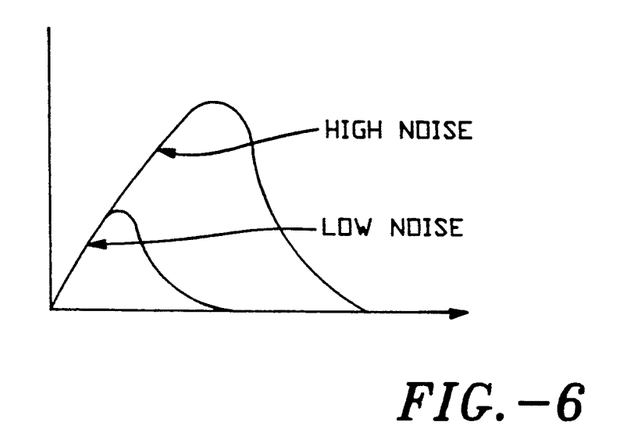
FIG. 6 is a pair of graphs illustrating change in function of the amplitude function generator as a function of detected noise level, in accordance with the FIG. 5 structure.

With reference to FIG. 5, the amplitude function generator 86 may be controlled by a suitable control signal in order to vary its transfer function. For example, a DC level corresponding to integrated noise level in the picture may be applied over a control line 87 to control the transfer function. This picture-condition adaptability of the transfer function is illustrated in FIG. 6, wherein when overall noise level in the picture is small, the transfer curve has an apex at a small level, such as 10 IRE units, and returns to approach zero output quickly, such as at about 3014 40 IRE units. However, when overall noise level is high, the transfer curve is expanded, so that the apex lies in a range such as about 20-30 IRE units, and with a return to zero at 50-60 IRE units, for example. One suitable control for controlling the amplitude function generator 86 is the DC output from the noise processor element 62 illustrated in the preferred embodiment in the referenced parent application. While that DC signal is described in the parent application as being a "logical" signal, actually it has a magnitude in the logical "on" state which, unless limited, will be related to the amplitude of noise in the picture. Thus, that DC signal is a very suitable control voltage for controlling the transfer characteristics of the amplitude function generator 86, as per FIG. 6, for example.

Figure 7:
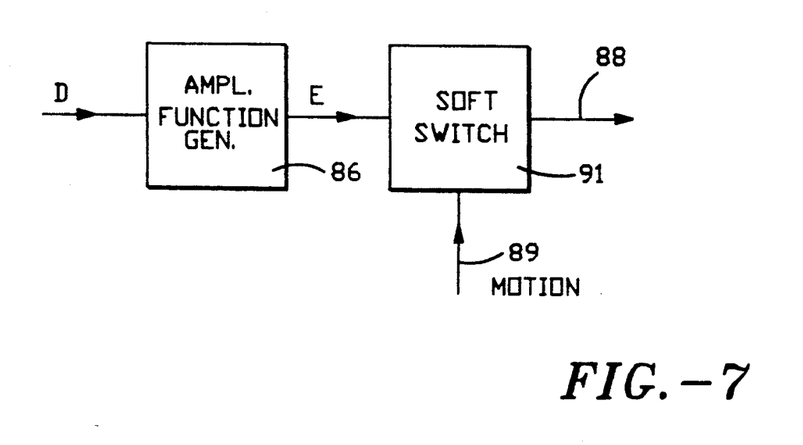
FIG. 7 is a block diagram illustrating a further modification the FIG. 1 circuitry by inclusion of a switching function which operates in function of detected motion within the picture content of the video signal.

FIG. 7 illustrates a further modification of the noise reducer 76. In this modification, a motion control signal on a line 89 controls a soft or proportional switch element 91 such that when there is no motion in the picture, the switch is closed, and when motion is present, the switch is proportionally opened, depending upon the magnitude of motion. The motion detector and control circuit 24 described in the referenced U.S. patent application Ser. No. 07/503,313, noted above provides one example of circuitry adapted to detect and quantify the level of motion within the picture image.

Figure 8:
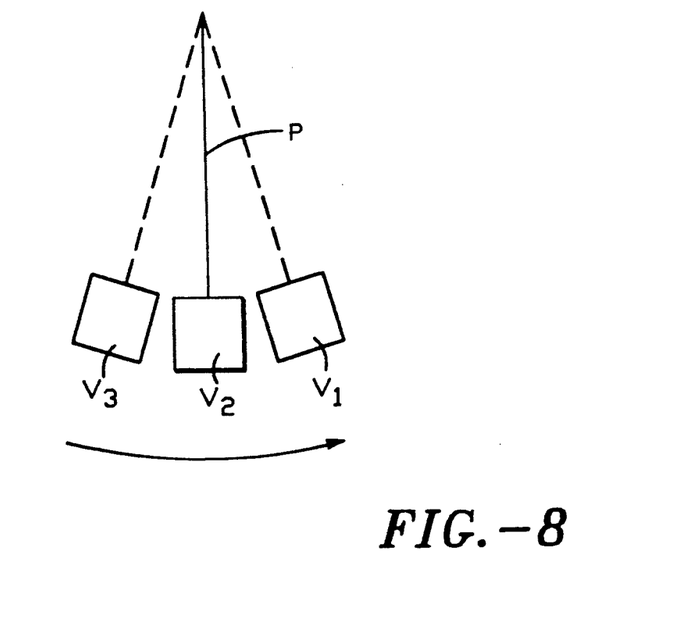
FIG. 8 is a graph of a small picture detail in motion, such as the swinging pendulum of a clock.

One example of small amplitude motion is the swinging pendulum P, e.g. of a clock in the picture image. This example is given in FIG. 8. Therein, the pendulum P is seen to be moving in a very regular, very periodic fashion, back and forth. A single transition, even if the amplitude of the transition is equal to the noise level, will be perceptible to the eye. The eye will catch the periodically moving line representing the pendulum and filter it out of the background noise in the picture. At the bottom point of the swing, the main image (V2) will be most apparent, bounded by a leading very faint image (V1) and a trailing very faint image (V3). While these faint V1 and V3 images will be visible to the extent that the noise is visible, noise reduction is not desirable in this situation. As the eye will automatically filter out the noise and perceive the pendulum with its very regular motion. It is not critical or particularly important as to how the particular motion is defined or characterized. If there is motion, it is desirable, albeit not essential, to reduce or eliminate noise reduction.

The additional features provided by the modifications of FIGS. 5, 6, 7 and 8 are modular. The noise reduction provided by the reducer 76 depicted in FIG. 4 may be realized at very little additional cost above and beyond the cost incurred to realize the temporal domain comb filter separator. By employing a noise level control, the efficiency of noise reduction can be approximately doubled. Above that enhancement, addition of the soft switch 91 (which necessarily includes as a species a one bit (two state) control) further improvements in noise reduction control are achieved, particularly to accommodate certain instances of low level motion within the picture image, but at some slight additional cost.

Figure 9:
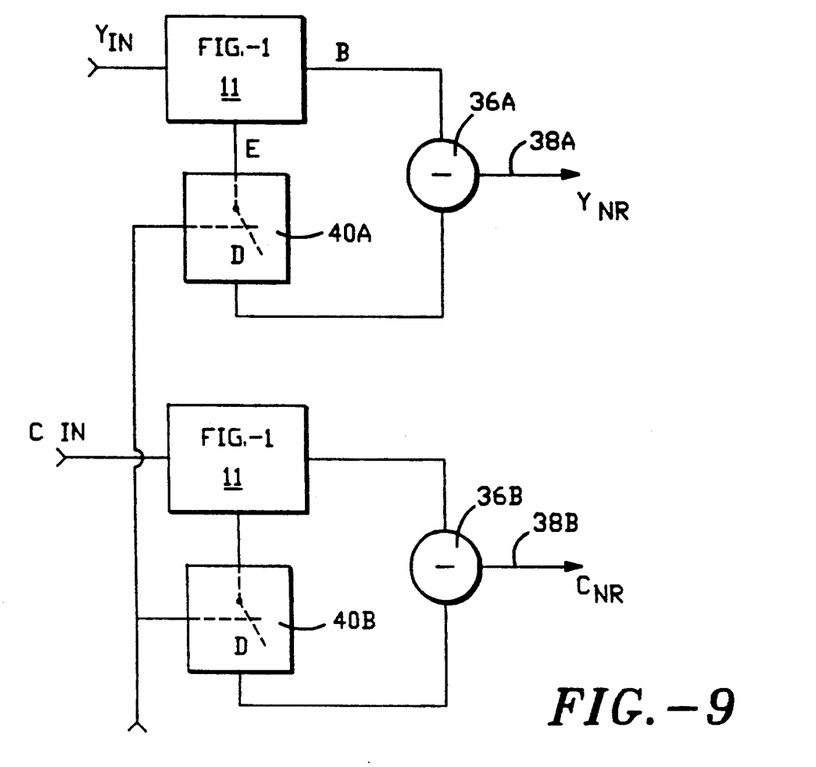
FIG. 9 is a block diagram of a luminance and chrominance noise reduction system which employs the FIG. 1 noise reducer in a subcarrier-demodulated chroma path and in a baseband luminance path and in which noise reduction control is effectuated by a single motion control signal.

FIG. 9 illustrates a luminance and chrominance noise reduction system 100 which includes one of the portion of the FIG. 1 circuit 11 marked out by dashed lines in a luminance path and and another one of the circuit portions 11 in a chrominance path. Electronic switches 40A and 40B are controlled in common by a motion control signal on a control line 42. E signal outputs from the switches 40A and 40B are combined in combining circuits 36A and 36B as described in conjunction with FIG. 1. A noise reduced luminance output 38A extends from the circuit 36A; and, a noise reduced chrominance output 38B extends from the circuit 36B.

Figure 10:
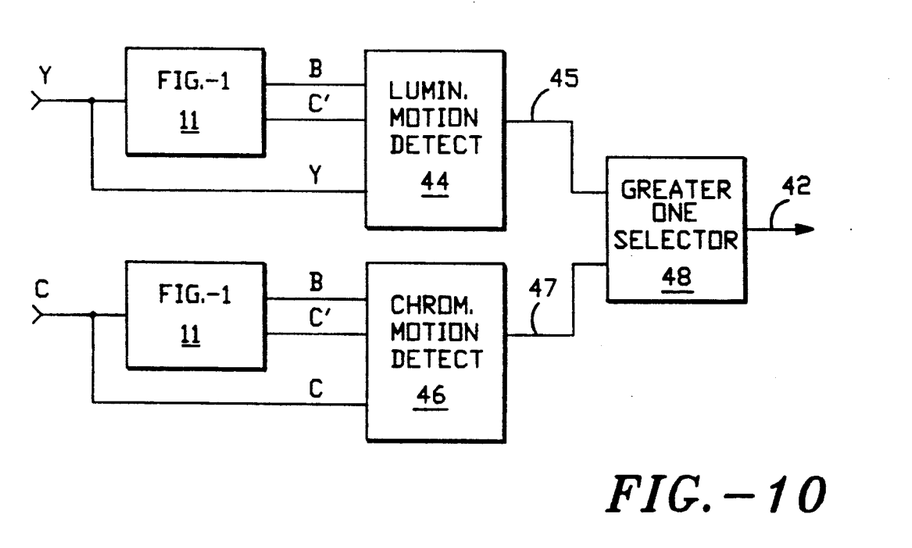
FIG. 10 is a block diagram of a motion control signal generator for generating the single motion control signal controlling the FIG. 9 circuit.

FIG. 10 illustrates one method for generating the motion control applied to the line 42. Again, the FIG. 1 circuit portions 11 in the luminance and chrominance paths provide signals B, C' and Y or C respectively leading into a luminance motion control circuit 44 and a chrominance motion control circuit 46. Motion outputs 45 and 47 respectively provided by the motion control circuits 44 and 46 feed into a greater of two circuit 48 which functions as a peak detector to detect the motion output having the greater magnitude. This selected greater magnitude motion output thus becomes the motion control supplied over the line 42 to control the soft switches 40A and 40B of the system 100 (FIG. 9).

STATEMENT OF INDUSTRIAL APPLICABILITY

The present invention when combined within television receiving apparatus provides circuitry for improving the quality of pictures being displayed by reducing the noise levels therein. In particular, graininess associated with film source material is noticeably reduced.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

I claim:

1. A noise reduction method for a baseband television signal received via a noise-introducing path, the method comprising the steps of:

averaging the television signal over two or more frames to produce an averaged function of the incoming television signal in which recurrent stationary picture information in the television signal is substantially canceled and aperiodic picture information in the television signal, including noise, is averaged, processing the averaged function of the incoming television signal with a non-linear amplitude function to provide a noise reduction cancellation signal, the non-linear amplitude function having a transfer characteristic which is approximately constant from zero to a first predetermined amplitude value and which returns from the first predetermined amplitude value to approach zero at a second predetermined amplitude value, and subtratively combining the noise reduction cancellation signal with the television signal to reduce noise therein.

2. The noise reduction method set forth in claim 1 wherein the television signal comprises a baseband luminance component signal separated from a quadrature modulated color subcarrier television signal.

3. The noise reduction method set forth in claim 1 wherein the television signal comprises a baseband chrominance component signal separated from a quadrature modulated color subcarrier television signal.

4. The noise reduction method set forth in claim 1 wherein the television signal comprises a baseband luminance component signal and a baseband chrominance component signal both having been separated from a quadrature modulated color subcarrier television signal, and wherein the said noise reduction method is simultaneously carried out in reference to said baseband luminance component signal and said baseband chrominance component signal.

5. The noise reduction method set forth in claim 4 comprising the further steps of
   detecting motion in at least one of the baseband luminance component and the baseband chrominance component signals,
   developing a motion control signal related to duration and magnitude of detected motion, and
   controlling the transfer function of said non-linear amplitude function as a function of the motion control signal.

6. The noise reduction method set forth in claim 4 comprising the further steps of
   detecting motion in both the baseband luminance component and in the baseband chrominance component signals,
   developing a motion control signal related to duration and magnitude of detected motion for each of said component signals, and
   selecting as the motion control signal the greater one of the developed motion signals.

7. The noise reduction method set forth in claim 1 wherein the first predetermined amplitude value is approximately 10–20 IRE units, and wherein the second predetermined amplitude value is approximately 35–55 IRE units.

8. The noise reduction method set forth in claim 1 wherein the averaging step produces the average as:

$$-\tfrac{1}{4}V1 + \tfrac{1}{2}V2 - \tfrac{1}{4}Vc$$

where V equals the television picture signal, the time delay interval between V1 and V2 is one frame interval, and the time interval between V1 and V3 is two frame intervals.

9. The noise reduction method set forth in claim 1 comprising the further steps of
   detecting noise level in the picture signal, and
   controlling the transfer characteristic of said non-linear amplitude function generator function as a function of detected noise level.

10. The noise reduction method set forth in claim 1 comprising the further steps of
    detecting motion in the picture signal,
    developing a motion control related to duration and magnitude of detected motion, and
    controlling the transfer function of said non-linear amplitude function as a function of the motion control signal.

11. The noise reduction method set forth in claim 10 wherein the step of controlling the transfer function of said non-linear amplitude function is carried out by proportionally scaling the amplitude of the transfer function.

12. The noise reduction method set forth in claim 90 wherein for small overall noise levels in the television signal the first predetermined amplitude value is approximately 10 IRE units and the second predetermined amplitude value is approximately 30–40 IRE units and for large overall noise levels in the television signal the first predetermined amplitude value is approximately 20–30 IRE units and the second predetemiend amplitude value is approximately 50–60 IRE units.

13. A luminance component noise reducer for a quadrature modulated subcarrier color television signal including a separated luminance component signal and a separated chrominance component signal, the television signal being received via a noise-introducing path, comprising:
   a luminance component signal input,
   a noise-reduced luminance signal output,
   frame delay means coupled to the input,
   averaging means coupled to the input and to the frame delay means for generating an average of luminance signal in which recurrent stationary picture information is cancelled and non-recurrent picture information, including noise, is averaged,
   amplitude function generator means for processing the average of luminance signal in accordance with a non-linear amplitude function transfer characteristic to provide a noise reduction cancellation signal, the non-linear amplitude function having a transfer characteristic which is approximately constant form zero to a first predetermined multitude value and which returns from the first predetermined amplitude value to approach zero at a second predetermined amplitude value, and
   combining means for substrictively combining the luminance component signal obtained from the frame delay means with said noise reduction cancellation signal, whereby noise in said luminance component signal is reduced.

14. The luminance component noise reducer set forth in claim 13 wherein the frame delay means includes a Y1 node connected to the luminance component input, a Y2 node having one frame delay from the Y1 node, and Y3 node having two frame delays from the Y1 node, and
   wherein the averaging means provides said average in accordance with the relation $-\tfrac{1}{4}Y1, +\tfrac{1}{2}Y2, -\tfrac{1}{4}Y3$.

15. The luminance component noise reducer set forth in claim 14 wherein the non-linear amplitude function is approximately constant from zero to a first predetermined amplitude value, and returns approximately constantly from the first predetermined amplitude value to approach zero at a second predetermined amplitude value.

16. The luminance component noise reducer set forth in claim 13 wherein the first predetermined amplitude value is approximately 10–20 IRE units, and wherein he second predetermined amplitude value is approximately 35–55 IRE units.

17. the luminance component noise reducer set forth in claim 13 further comprising noise level measuring means connected to measure overall noise level in the television signal for generating a noise level control signal, and wherein the amplitude function generator means is responsive to the noise level control signal for changing the non-linear function in relation thereto.

18. The luminance component noise reducer set forth in claim 13 further comprising motion detector means for detecting motion activity in the television signal and for generating a motion control signal, and switch means connected between the amplitude function generator means and the combining means, the switch means being controlled by the motion control signal.

19. The luminance component noise reducer set forth in claim 18 wherein the switch means is a proportional switch responsive to amplitude of the motion control signal.

20. The noise reduction method set forth in claim 17 wherein for small overall noise levels in the television signal the firs predetermined amplitude value is approximately 10 IRE units and the second predetermined amplitude value is approximately 30–40 IRE units and for large overall noise levels in the television signal the firs predetermined amplitude value is approximately 20–30 IRE units and the second predetermined amplitude value is approximately 50–60 IRE units.

21. A signal processor for a quadrature modulated subcarrier composite television signal receiver wherein the composite television signal applied to the receiver includes a luminance component and a chrominance component, the signal processor comprising a time domain comb filter separator including:
  a V1 signal input for receiving the undelayed composite television signal,
  first frame delay means coupled to the V1 signal input and having a one-frame-delayed V2 output,
  second frame delay means coupled to the V2 output and having a two-frame-delayed V3 output,
  first amplifier means coupled to the V1 signal input for providing an output in the form of $-\frac{1}{4}V1$,
  second amplifier means coupled to the V2 output for providing an output in the form of $+\frac{1}{2}V2$,
  third amplifier means coupled to the V3 output for providing an output in the for of $-\frac{1}{4}V3$, and
  combiner means coupled for combining the $-\frac{1}{4}V1$, $+\frac{1}{2}V2$ and $-\frac{1}{4}V3$ outputs to provide a full bandwidth combed chrominance component signal; and the signal processor further comprising
  a luminance component noise reducer including:
    amplitude function generator means for processing the combed chrominance component signal in accordance with a non-linear amplitude function to provide a noise reduction cancellation signal, the non-linear function having a transfer characteristic which is approximately constant from zero to a first predetemined amplitude value and which returns from the first predetermined amplitude value to approach zero at a second predetermined amplitude value,
    first subtraction means for subtracting the noise reduction cancellation signal from the combed chrominance component signal to provide a chroma/noise cancellation signal,
    second subtraction means for subtracting the chroma/noise cancellation signal from the one-frame-delayed V2 output, thereby to provide a combed luminance component in which noise has been reduced.

22. The signal processor set forth in claim 21 further comprising chroma band pass filter means connected at the output of the combiner means for passing energy groups lying at the vicinity of the quadrature modulated subcarrier, first delay matching means for delay matching the output of the combiner means with the output of the chroma band pass filter means, third subtraction means for subtracting the delay matched output of the first delay matching means from the output of the chroma band pass filter means to produce a band rejected signal and wherein the band rejected signal is applied to the amplitude function generator means, and further comprising second delay matching means for delay matching the V2 output to the delay of the chroma band pass filter means before it is applied to the second subtraction means.

23. The signal processor set forth in claim 21 wherein the non-linear function of the amplitude function generator means is approximately constant from zero to a first predetermined amplitude value, and returns approximately constantly from the first predetermined amplitude value to approach zero at a second predetermined amplitude value.

24. The signal processor set forth in claim 21 wherein the first predetermined amplitude value is approximately 10–20 IRE units, and wherein the second predetermined amplitude value is approximately 35–55 IRE units.

25. The signal processor set forth in claim 21 further comprising noise level measuring means connected to measure overall noise level in the television signal for generating a noise level control signal, and wherein the amplitude function generator means is responsive to the noise level control for changing the non-linear function in relation thereto.

26. The signal processor set forth in claim 21 further comprising motion detector means for detecting motion activity in the television signal and for generating a motion control signal, and switch means connected between the amplitude function generator means and the first subtraction means, the switch means being controlled by the motion control.

27. The signal processor set forth in claim 26 wherein the switch means is a proportional switch responsive to amplitude of the motion control signal.

28. The noise reduction method set forth in claim 25 wherein for small overall noise levels in the television signal the first predetermined amplitude value is approximately 10 IRE units and the second predetemiend amplitude value is approximately 30–40 IRE units and for large overall noise levels in the television signal the first predetermined amplitude value is approximately 20–30 IRe units and the second predetermined amplitude value is approximately 50–60 IRE units.

29. Noise reduction apparatus for a baseband television signal received via a noise-introducing path, comprising:
  means for averaging the television signal over two or more frames to produce an averaged function of the incoming television signal in which recurrent stationary picture information in the television signal is substantially cancelled and aperiodic picture information in the television signal, including noise, is averaged,
  means for processing the averaged function of the incoming television signal with a non-linear amplitude function to provide a noise reduction cancellation signal, the non-linear amplitude function having a transfer characteristic which is approximately constant from zero to a first predetemiend amplitude value and which returns from the first predetermined amplitude value to approach zero at a second predetemiend amplitude value, and
  means for substractively combining the noise reduction cancellation signal with the television signal to reduce noise therein.

* * * * *